United States Patent [19]

Shapery

[11] Patent Number: 5,507,453
[45] Date of Patent: Apr. 16, 1996

[54] GYRO STABILIZED VECTORED THRUST VERTICAL TAKEOFF OR LANDING AIRCRAFT

[76] Inventor: Sandor W. Shapery, 402 W. Broadway, Suite 1200, San Diego, Calif. 92101-3504

[21] Appl. No.: 172,085

[22] Filed: Dec. 21, 1993

[51] Int. Cl.⁶ .......................... B64C 15/00; B64C 29/00; B64D 27/02
[52] U.S. Cl. ...................... 244/12.5; 244/7 B; 244/12.2; 244/56; 244/73 C
[58] Field of Search .................... 244/7 A, 7 B, 244/8, 10, 12.2, 12.4, 12.5, 12.6, 23 D, 36, 56, 66, 67, 73 C

[56] References Cited

U.S. PATENT DOCUMENTS

| | | | |
|---|---|---|---|
| 2,668,026 | 2/1954 | Price | 244/7 B |
| 2,874,920 | 2/1959 | Mallinckrodt | 244/7 B |
| 3,096,044 | 7/1963 | Gould | 244/12.2 |
| 3,489,374 | 1/1970 | Morcom | 244/12.2 |
| 4,037,807 | 7/1977 | Johnston et al. | 244/7 B |
| 4,117,992 | 10/1978 | Vrana | 244/12.2 |
| 4,273,302 | 6/1981 | Jordan | 244/12.2 |
| 4,941,628 | 7/1990 | Sakamoto et al. | 244/12.2 |
| 5,102,066 | 4/1992 | Daniel | 244/73 C |
| 5,295,643 | 3/1994 | Ebbert et al. | 244/12.2 |
| 5,390,877 | 2/1995 | Nightingale | 244/23 D |
| 5,421,538 | 6/1995 | Vussa | 244/8 |

*Primary Examiner*—Andres Kashnikow
*Assistant Examiner*—Virna Lissi Mojica
*Attorney, Agent, or Firm*—Beehler & Pavitt

[57] ABSTRACT

The thrust director assembly may include a thrust director cone with its apex oriented into the fan airstream and a larger thrust vectoring ring concentric with the director cone. The thrust director assembly axis is angularly displaceable relative to the fan axis for modifying the geometry of the duct outlet such that the aperture of the outlet annulus is reduced on one side and simultaneously enlarged at a diametrically opposite side. The effect of the modified geometry is to increase fan thrust on the enlarged side while diminishing thrust on the narrowed side, thereby to develop a lateral thrust component acting on the airframe for providing long moment pitch and roll control.

4 Claims, 5 Drawing Sheets

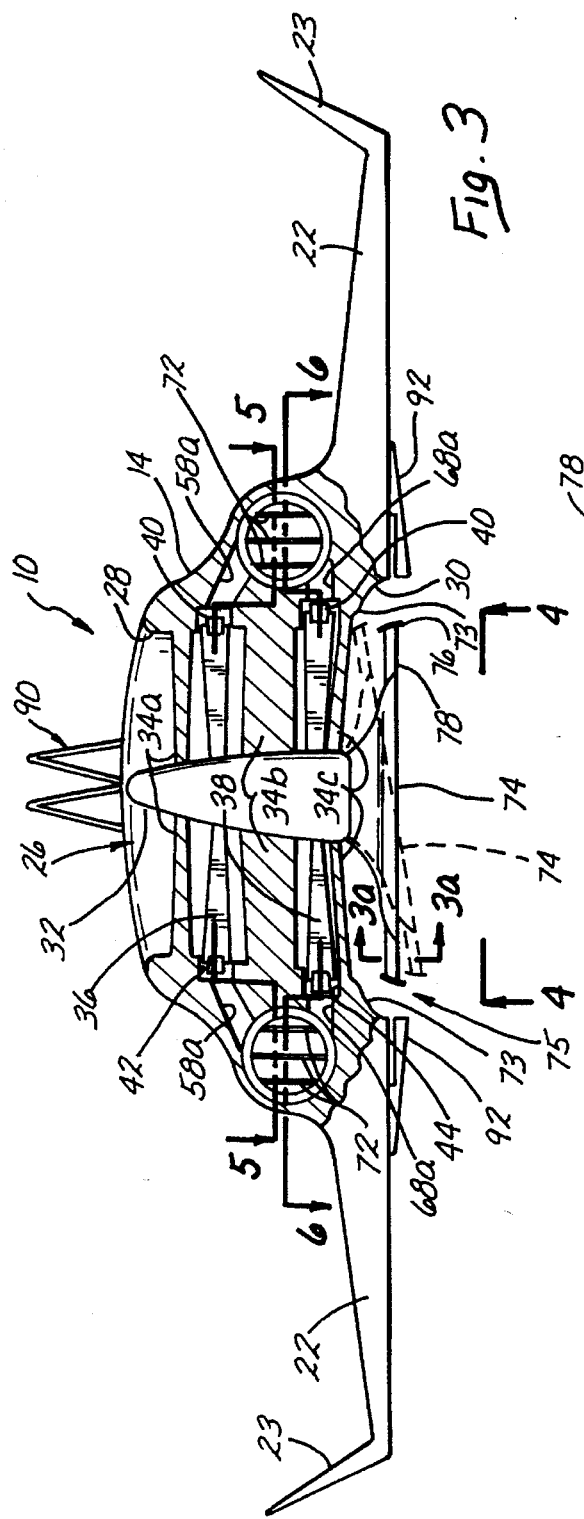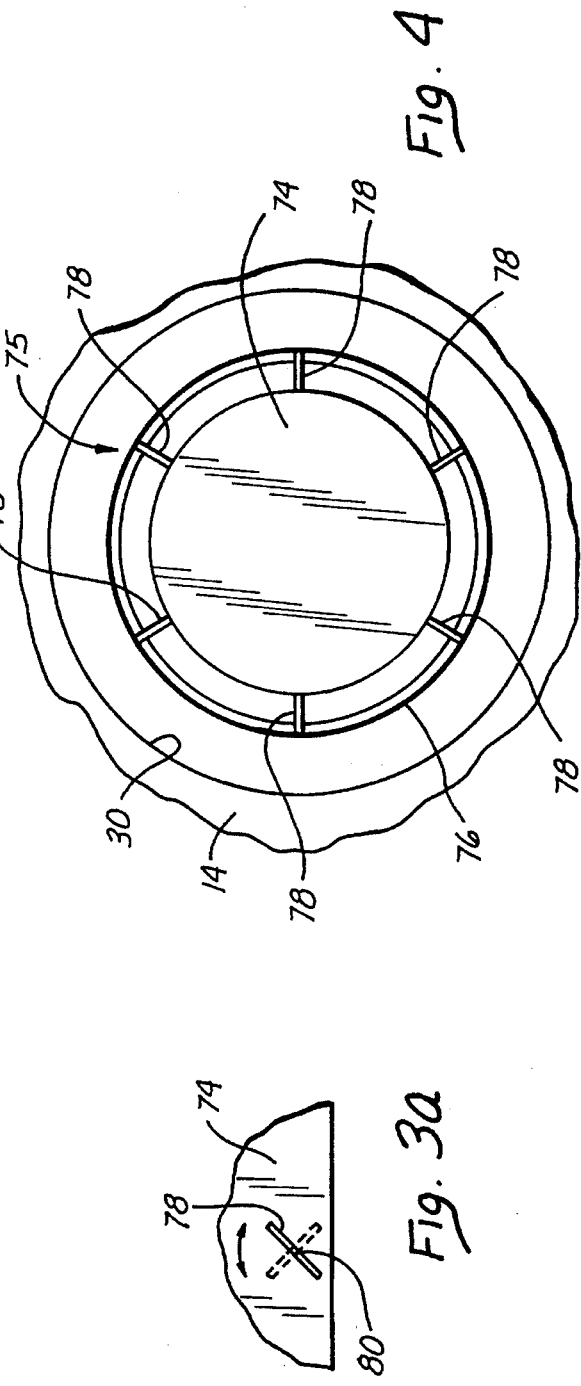

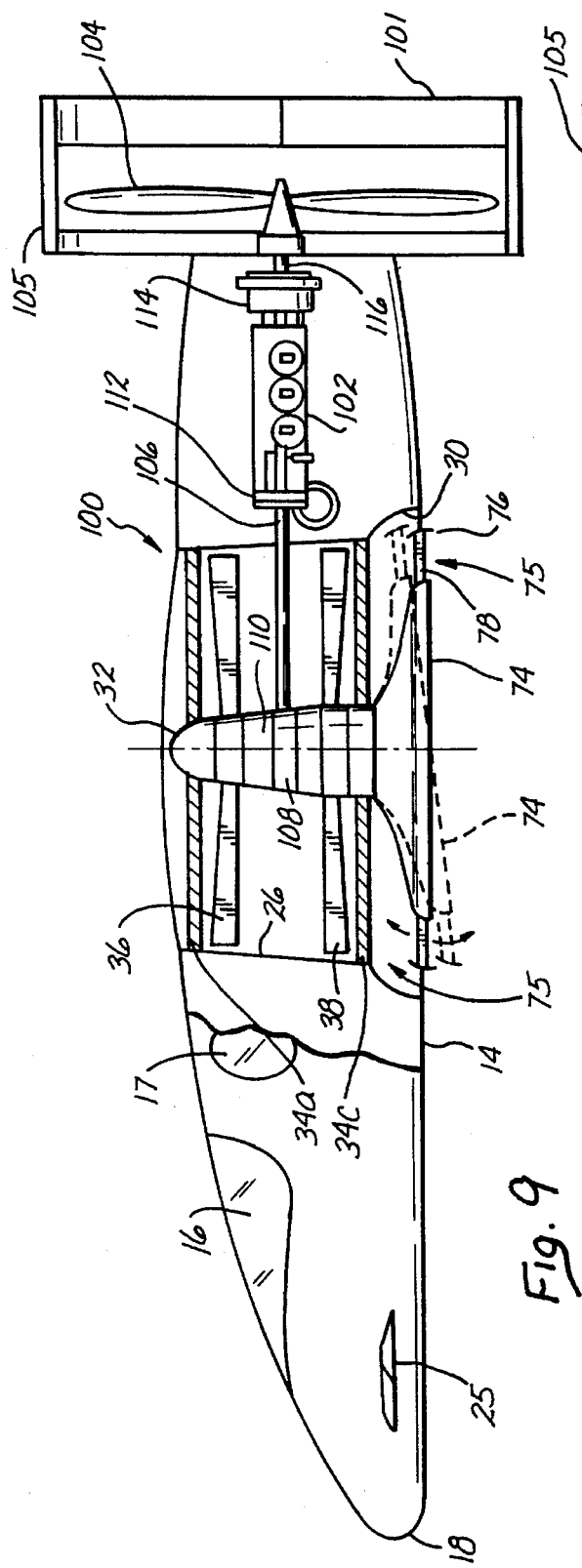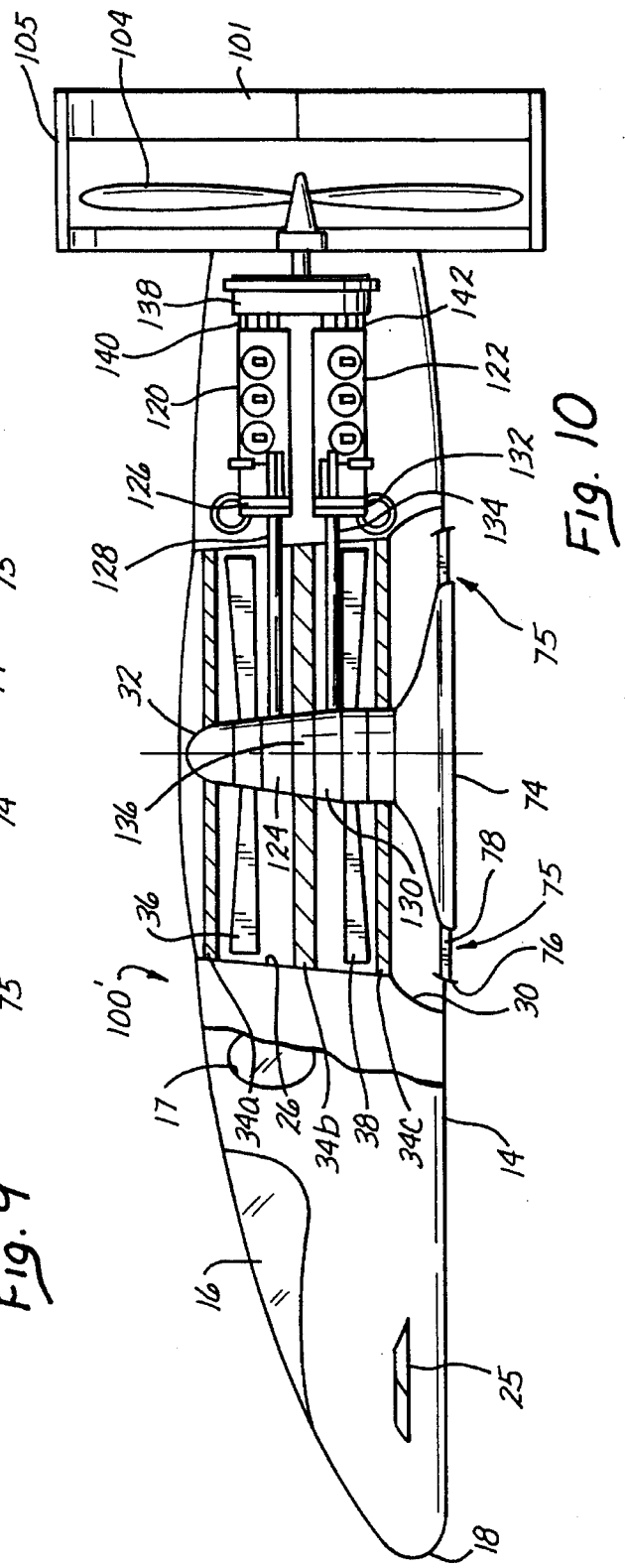

GYRO STABILIZED VECTORED THRUST VERTICAL TAKEOFF OR LANDING AIRCRAFT

BACKGROUND OF THE INVENTION

1. Field of the Invention

This invention pertains to the field of aircraft capable of vertical take-off or landing and in particular relates to improved stabilization of such aircraft in vertical flight.

2. State of the Prior Art

Much effort has been directed towards the development of aircraft capable of vertical take-off or landing which are not restricted to airport runways but can land and take-off from any relatively small open area.

Rotary wing aircraft, such as helicopters, are one answer to this problem. Although helicopters are capable of vertical flight and hover, they require large exposed rotor blades which are vulnerable to strikes and dangerous to persons in the vicinity of the aircraft on the ground. Further, helicopters achieve horizontal flight by cyclic control of the rotor blade pitch, and control ascent and descent by collective control of the blade pitch. The rotor is exposed to the airstream during horizontal flight so that large differences in airspeed over the blades occur as each blade advances into the airstream on one side of the rotor disk and then recedes on the opposite side of the disc where the blade moves with the airstream. The resultant difference in lift must also be compensated by cyclic adjustment of the rotor blades. These considerations lead to complex rotor control systems which are difficult and costly to maintain, and which require considerable pilot training and skill.

In order to overcome these difficulties, aircraft have been proposed which are capable of vertical flight for takeoff and landing, but which once airborne, transition to more efficient winged horizontal flight. These designs have power plants which develop vertical thrust only during take-off and landing, and provide horizontal thrust during forward flight. Various schemes have been devised for developing the vertical and horizontal thrust vectors, including rotary nozzles for jet engines, deflector vanes for propeller drives, and pivotably mounted engines, among others. One known approach to this type of aircraft is the use of a ducted fan or fans mounted in the airframe for developing vertical thrust aligned with the aircraft center of mass. Horizontal thrust is developed either by deflecting the vertical thrust once take-off has been achieved, or by operating a separate horizontal thruster.

VTOL aircraft with a single vertical thruster, such as a ducted fan, present special stability problems during the transition between vertical and horizontal flight modes. In vertical flight close to the ground, the aircraft may be stabilized against wobbling by the cushion of pressurized air developed between the aircraft and the underlying ground surface. The same cushion of pressurized air, however, provides a zero friction support and allows the aircraft to move easily or skitter in a horizontal plane, a problem which is addressed below. This effect, however, is limited to close proximity to the ground surface, and diminishes rapidly with altitude of the aircraft. During horizontal flight on the other hand, aircraft attitude may be stabilized by conventional control surfaces on the airframe. An interval exists, however, where the aircraft's altitude no longer allows build up of a cushion of compressed air underneath, yet the horizontal airspeed of the aircraft is insufficient for effective use of the control surfaces. Some additional means must therefore be provided for stabilizing the aircraft during this interval. Adjustable thrust deflectors and multiple thrusters have been employed which continuously respond to and counteract deviations of the airframe from a reference attitude, but this approach is complex and difficult to achieve in practice.

A simpler approach relies upon inertial stabilization by exploiting the gyroscopic effect of a rotating disc or ring. One known expedient involves the use of a horizontal fan as a gyroscopic rotor to obtain both vertical thrust and horizontal stability of the aircraft, as exemplified by U.S. Pat. No. 4,773,618 issued to Ow, where lift is derived by directing jet exhaust gases over air foils in a large fan which also provides gyroscopic attitude control in all phases of flight. A somewhat different approach is described in Wright et al. U.S. Pat. No. 4,778,128 which shows a ducted fan driving a radial airflow over a single circular airfoil to provide lift, the air foil being rotatable for inertial stabilization of the craft.

De Toia, U.S. Pat. No. 4,050,652 shows an airframe with counterrotating discs which provide both lift and gyroscopic stability.

Messina U.S. Pat. No. 4,461,436; Jordan U.S. Pat. No. 4,387,867 and Bostan U.S. Pat. No. 4,312,483 all show disc shaped gyroscopically stabilized "flying saucer" type craft with a central ducted fan and a separate rotating disc which provides gyroscopic stability. Jordan and Messina drive the gyro disc with vanes in the ducted fan airstream, while Bostan provides a separate electric drive for the gyro rotor.

The prior art designs enumerated above fall into two groups: a first group comprising aircraft which have no aerodynamic control surfaces active during horizontal flight and therefore require gyroscopic stabilization in all phases of flight, and a second group of aircraft stabilized by means of aerodynamic surfaces during forward flight without resort to inertial stabilization. In the latter case, the known designs do not provide for a transition between gyroscopically stabilized flight and purely aerodynamically stabilized flight.

The prior designs rely on the gyro rotor not only to hold the aircraft in a constant plane but also to counteract the torque of the fan drive, which otherwise would tend to yaw the entire airframe in a direction opposite to the fan rotation. In such an arrangement the gyro rotor cannot be stopped in flight without transmitting the fan's reaction torque to the airframe.

It is desirable to disable the gyroscopic stabilization system during transition to a purely aerodynamically stabilized flight mode because the inertia produced by the gyro rotor interferes with aerodynamic control of the aircraft. The gyroscopic tendency to maintain a constant plane of rotation hinders, for example, the ability to bank the aircraft during turns in forward flight.

Yet another complication characteristic of vertical takeoff and landing aircraft is the tendency of the aircraft to skitter on the cushion of compressed air created between the aircraft and the ground surface while hovering during take-off or landing in close proximity to the ground. Such aircraft tend to move unpredictably in any direction over the ground surface, and may respond to slight sloping of the ground surface, prevailing winds or any slight lateral bias in the vertical thrust. This problem cannot be overcome by gyroscopic stabilization of the aircraft since the skittish motion does not necessarily involve any tilting or wobble of the airframe, only motion in a horizontal plane parallel to the ground surface. Various schemes have been devised in an attempt to resolve this difficulty, including the use of lateral thrusters, swiveling nozzles arranged about the periphery of the aircraft and swiveling slat arrangements for deflecting a portion of the vertical thrust laterally to hold the aircraft against horizontal displacement during low altitude hover. However, no control system has been developed which is of sufficient simplicity, reliability and effectiveness for overcoming this problem.

A continuing need exists for vertical take-off and landing aircraft which are stable during vertical flight without hindrance to aerodynamically stabilized winged horizontal flight.

SUMMARY OF THE INVENTION

Winged flight, where lift is generated by airflow over aerodynamic surfaces, is considerably more efficient than flight sustained by generating vertical thrust. The forward thrust needed for high speed winged flight is typically about one half the vertical thrust required for lifting the aircraft in vertical flight. Aircraft capable of transition between winged flight for efficient high speed forward travel and vertical flight for convenient takeoff and landing are highly desirable.

The present invention addresses the shortcomings of the prior art by providing a vertical take-off and landing aircraft characterized by novel stabilization systems in vertical flight and hover, particularly while in close proximity to a ground surface, without compromise to maneuverability in high speed winged flight.

The stabilization systems include a gyroscopic stabilization system integrated with a counterrotating ducted lift fan arrangement for stabilizing the airframe against wobble, and a lift fan thrust vectoring system which can be manually or automatically operated for controlling skittering of the aircraft while hovering in close proximity to a ground surface and for directing the aircraft while in vertical flight. The VTOL aircraft of this invention has an airframe, a duct in the airframe, counterrotating fans in the duct driven for producing vertical lift to support the airframe in vertical flight and hover, one or more thrusters for powering the aircraft in forward flight, and aerodynamic surfaces effective for developing lift and stabilizing the airframe in forward winged flight. Engine power can be directed for developing either vertical or forward lift, or a combination of the two so that transition can be made between vertical flight and high speed winged flight.

In a first aspect of the invention, one of the counterrotating fans is configured and driven relative to the other of the fans for maintaining a net moment of angular inertia for gyroscopically stabilizing the airframe in flight. The net moment of angular inertia may be developed by one of said fans turning a greater mass than the other fan. Alternatively, one of the fans may be turned at a greater speed than the other fan to develop the net moment of angular inertia. The counterrotating fans may be configured so as to develop a net zero torque acting on the airframe while turning at different speeds in relation to each other. This result may be achieved by providing differential blade pitch or blade areas on the counterrotating fans. The blade pitch may be fixed on both fans. Alternatively, yaw of the airframe may be controlled instead by means of vanes arranged in the vertical airstream driven by the fans. Still another approach to controlling yaw of the airframe induced by speed differential of the counterrotating fans is by a thruster mounted on the airframe so as to counteract the yaw. The thruster may be one of two engines mounted on opposite sides of the fan duct and operated to develop a somewhat greater thrust than the other of the two engines, so as to control yaw.

In a second aspect of the invention, the vertical takeoff and landing aircraft has an airframe including one or more thrusters and aerodynamic lifting surfaces for sustaining the airframe in forward flight, aerodynamic control surfaces for stabilizing the airframe in forward flight, a fan arrangement driven for lifting the airframe in vertical flight, a gyroscopic system for stabilizing the aircraft in vertical flight by gyroscopic precession, and controls for disabling the gyroscopic system during forward flight to allow purely aerodynamic control and stabilization of the aircraft. The gyroscopic system may be a rotating mass integrated with the fan system such that gyroscopic precession is disabled upon stopping fan rotation. Alternatively, the gyroscopic stabilization system may include counterrotating fans where one of the fans is turned at a higher speed than a second, oppositely rotating fan thereby to achieve a net precessional effect, which ceases when the fans are unpowered or rotated at equal speed during forward flight where the aerodynamic control surfaces control and stabilize the aircraft.

In a third aspect of the invention, a vertical take-off or landing aircraft comprises an airframe with counterrotating fans driven for rotation in a fan duct defined through the center of mass of the airframe, and jet engines mounted on generally diametrically opposed sides of the fan duct. The jet engines have jet exhaust nozzles for providing thrust in horizontal, forward flight, and side ducts connected for driving the fans with bypass compressor air and gas exhaust from the engines. A valve arrangement is actuatable for selectively directing the flow of the engine bypass compressor air and exhaust gases between the side ducts for driving the fans and the engine exhaust nozzles for propelling the airframe in forward flight. The engine exhaust nozzles may be vectored thrust nozzles.

In a fourth aspect of the invention, a vertical take-off or landing aircraft has an airframe, counterrotating fans in a fan duct defined through the airframe, a power plant arrangement for driving the counterrotating fans so as to develop vertical thrust for lifting the airframe, and a thrust director assembly mounted below the fans in the outlet of the fan duct. Preferably the outlet diameter of the fan duct is enlarged so that the effective outlet aperture with the thrust director assembly mounted therein is substantially equal to the aperture of the duct inlet. The thrust director assembly may include a thrust director cone with its apex oriented into the fan airstream and a larger thrust vectoring ring concentric with the director cone. In a neutral position the thrust director assembly is axially aligned with the counterrotating fans and the duct outlet aperture is symmetrically annular about the director cone. The thrust director assembly axis is angularly displaceable relative to the fan axis for modifying the geometry of the duct outlet such that the aperture of the outlet annulus is reduced on one side and simultaneously enlarged at a diametrically opposite side. The effect of the modified geometry is to increase fan thrust on the enlarged side while diminishing thrust on the narrowed side, thereby to develop a lateral thrust component acting on the airframe for providing long moment pitch and roll control. The duct outlet is shaped so that the fan airstream is displaced radially outwardly around the circumference of the thrust director assembly and away from the center of mass axis of the aircraft, thereby augmenting the moment of force acting on the center of mass of the aircraft which can be developed by angular displacement of the thrust director assembly. A control linkage may be provided by which a pilot may actuate displacement of the thrust director assembly so as to stabilize the airframe against undesired skittering movement in a horizontal plane during low altitude hover. Alternatively, control over the thrust director assembly may be linked to an accelerometer arrangement sensitive to horizontal movement of the airframe not initiated by deliberate pilot control, and arranged so as to automatically counteract such movement by appropriate repositioning of the thrust director assembly.

In a fifth aspect of the invention, a first form of the invention is a vertical take-off and landing aircraft powered by an internal combustion engine or engines coupled for driving counterrotating fans by means of a drive linkage between the engine and one of the fans, a second of the fans being driven for counterrotation relative to the first fan by means of a rotation reversing gear box connected between the two fans. The second of the fans may be driven through a variable speed gear box to enable adjustment of the relative speeds of the two fans, so as to establish or cancel net gyroscopic precession for stabilizing the aircraft. In an alternate form of this fifth aspect of the invention, the internal combustion power plant may include two counterrotating engines, each linked for driving a corresponding one of the counterrotating fans. A reversing gear box may be coupled between the fans for driving both fans with only one of the engines and including a clutch for disengaging the reversing gear box while the counterrotating fans are each separately driven by one of the engines. Horizontal thrust for propelling the airframe in forward flight may be provided by a pusher propeller driven by the same internal combustion power plant driving the counterrotating fan arrangement. In the particular arrangement just mentioned where separate engines drive each of the counterrotating fans, a pusher propeller may be coupled through suitable transmission, clutch and drive shaft linkages to both engines, so that the power output of either of the engines may be directed to any combination of one or both of the fans and the pusher propeller, so as to support the aircraft in vertical flight, horizontal flight, and transitional phases between the two flight modes.

These and other improvements, advantages and features of the present invention will be better understood by reference to the following detail description of the preferred embodiments taken in conjunction with the accompanying drawings.

BRIEF DESCRIPTION OF THE DRAWINGS

FIG. 3 is a transverse sectional view taken along line 3—3 in FIG. 2;

FIG. 4 is a bottom plan view of the vertical thrust director cone assembly and fan duct outlet seen along line 4—4 in FIG. 3;

FIG. 3a is a detail view in section taken along line 3a—3a in FIG. 3, showing the yaw control vanes on the thrust deflector cone;

FIG. 9 is a section taken along line 9—9 in FIG. 8 showing the aircraft with a single internal combustion engine powering the counterrotating lift fans and a pusher propeller;

FIG. 10 is a view as in FIG. 9 with dual internal combustion engines supplying power to the counterrotating lift fans and a pusher propeller.

DETAILED DESCRIPTION OF THE PREFERRED EMBODIMENTS

Figure 1:
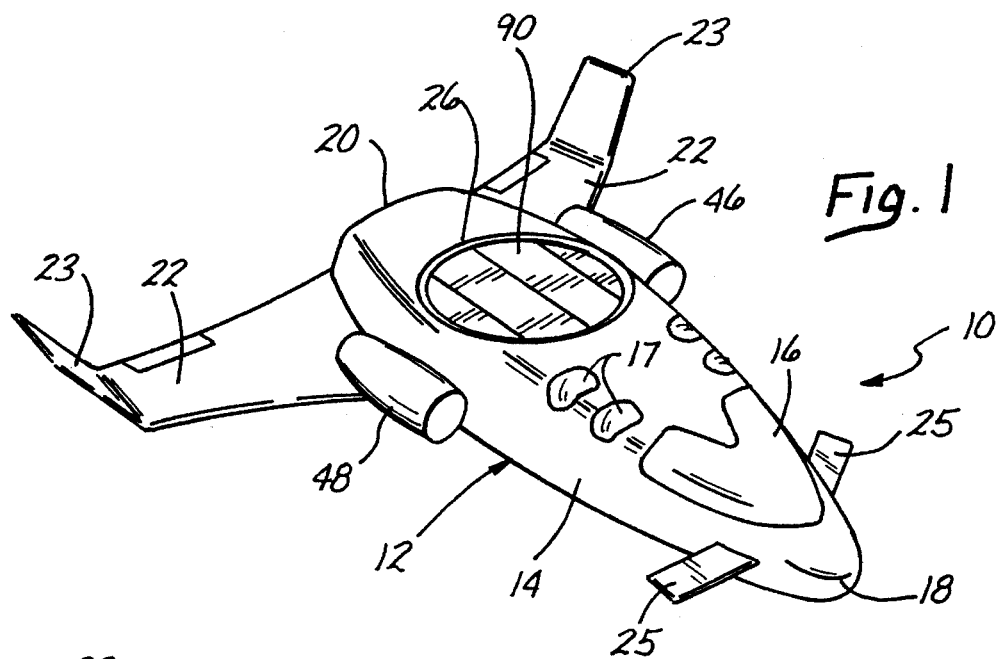
FIG. 1 is a perspective view of a typical vertical take-off and landing aircraft according to this invention.
Figure 2:
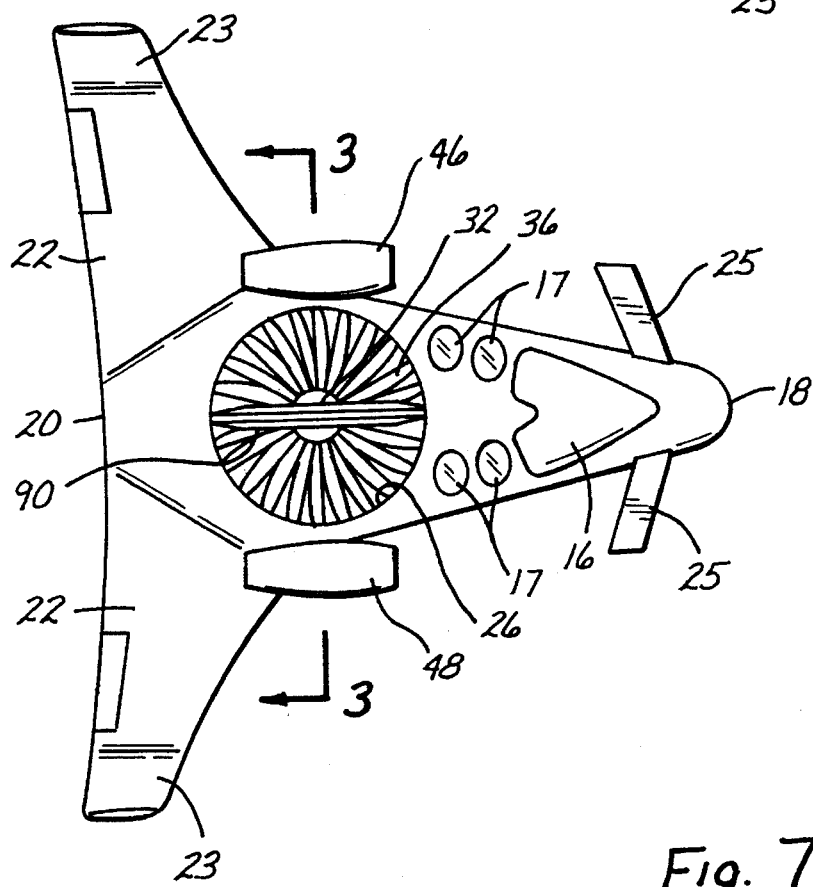
FIG. 2 is a top plan view of the aircraft of FIG. 1.

With reference to the drawings, FIG. 1 shows a vertical take-off and landing aircraft, generally designated by the numeral 10, which has an airframe 12 with an elongated fuselage 14, a crew and passenger cabin 16 with viewing ports 17, a nose 18 and a rear end 20. Wings 22 with rudder equipped winglets 23 attached to the rear of the fuselage and canards 25 mounted near the nose provide aerodynamic lift and stability in higher speed forward flight under thrust provided by dual fan jet engines 46, 48. A fan duct 26 extends vertically through the airframe between a top intake opening 28 and a bottom exhaust opening 30 in the fuselage, as seen in FIGS. 2 and 3, with the center axis of the duct aligned with the center of mass of the airframe 12.

A generally conical hub 32, with a narrow end oriented towards inlet 28 and a wider bottom end towards outlet 30, is axially centered in the fan duct 26 and supported by radial stators 34a, 34b and 34c. An upper fan 36 and a lower fan 38 are each mounted for free rotation on the center hub 32 above and below, respectively, of the middle stator 34b. The radially outer tip of each blade of the fans carries an impeller vane 40 which is transverse to the plane of the fan. The vanes 40 of the two fans move within annular spaces 42, 44 circumferentially defined in the wall of the fan duct 26. Two fan jet engines are mounted to the fuselage 14 on diametrically opposite sides of the fan duct 26. Each engine has an engine core 50 enclosed in a cowling 52 which defines a bypass space 54 around the engine core. A series of compressor fans 54 is driven by the engine core for compressing atmospheric air into the bypass space 54.

Figure 5:
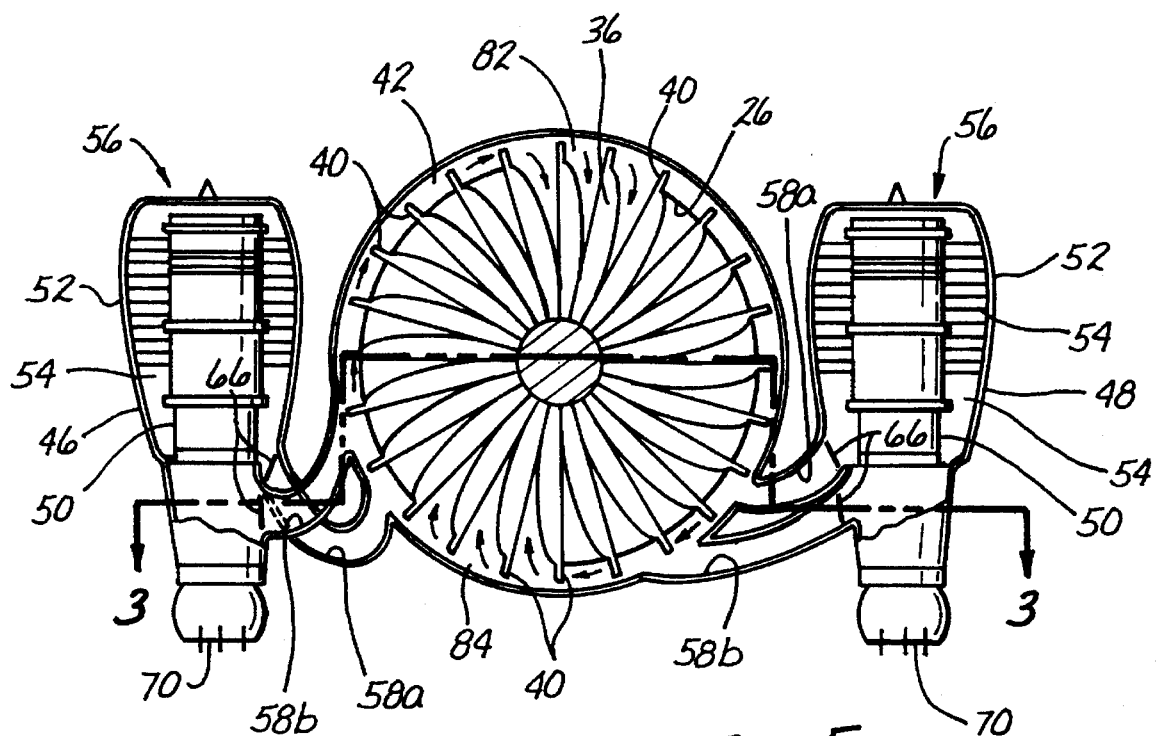
FIG. 5 is a horizontal cross-sectional view of the ducted fan arrangement showing the two fan jet engines exhaust ducting for driving the upper fan in a clockwise direction.
Figure 6:
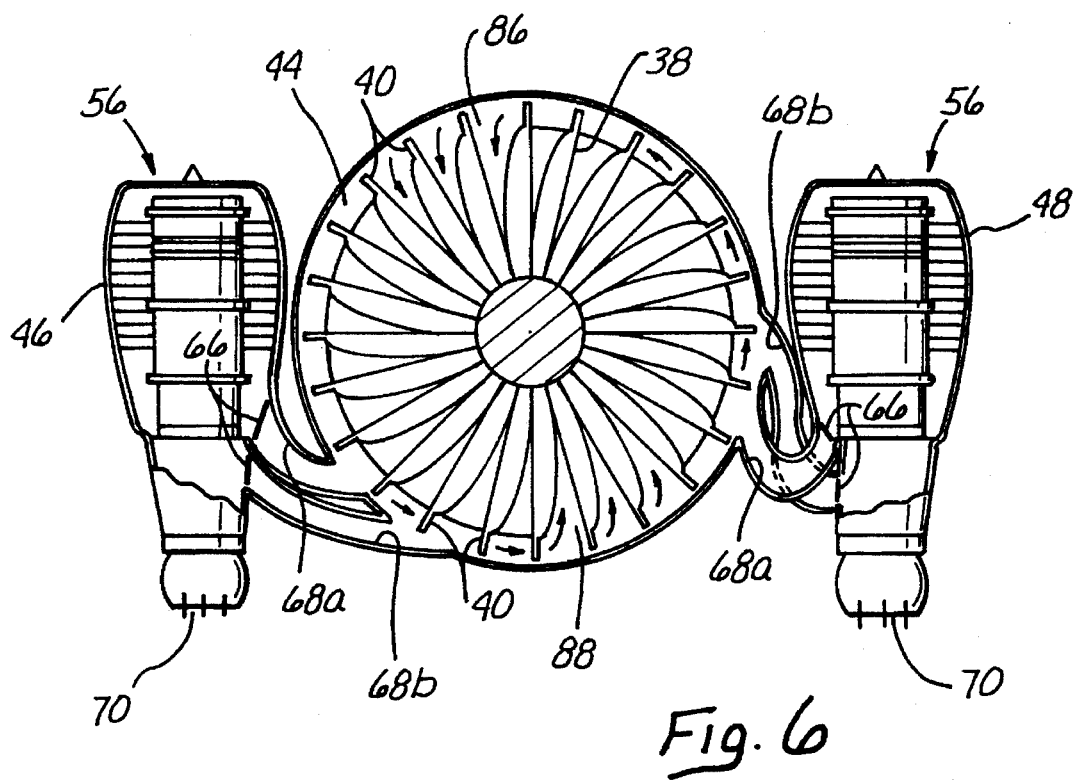
FIG. 6 is a section as in FIG. 5 but axially displaced along the fan axis to show the fan jet ducting for driving the lower fan in counterclockwise direction, so that the fans of FIGS. 5 and 6 are counterrotating.

Each fan jet engine 46, 48 has four side ducts, upper side ducts 58a, 58b which open into the annular space 42 of the upper fan 36, as shown in FIG. 5, and lower side ducts 68a, 68b which open into the annular space 44 of the lower fan 38, as shown in FIG. 6. The arrangement of the side ducts in the vertical plane is best understood by reference to FIG. 3. Side ducts 58a and 68a receive air compressed by the bypass fans 54, while side ducts 58b and 68b admit hot exhaust from the engine cores 50. These two gas streams are injected tangentially to the periphery of the fans 36, 38. The upper side ducts 58a, 58b are connected to the annular space 42 so as to establish a clockwise flow of engine exhaust gases within the annular space 42. The high velocity exhaust gases of both fan jet engines 46, 48 act against the impeller vanes 40 of the upper fan 36 to turn this fan in a clockwise direction. The lower side ducts 68a, 68b connect to the annular space 44 of the lower fan 38 so as to direct the engine exhaust gases in a counterclockwise direction within the annular space 44, driving the lower fan 38 in a counterclockwise direction. This cross coupling of the engine exhaust through the side ducts 58a,b and 68a,b results in mutual counterrotation of the two fans 36, 38 in the vertical duct 26. Each annular space 42, 44 is interrupted by discharge ports 82, 84 and 86,88 respectively which provide an escape opening into the fan duct 26 through which the jet exhaust gases are discharged from the annular opening and into the fan downwash stream. The discharge ports 82, 84, 86, 88 are each situated downstream from one of the left and right engine exhaust inlets, respectively, so that exhaust gases push the fan impeller vanes 40 along an arc segment of the annular spaces before discharging into the fan duct and exhausting with the fan downwash through the duct outlet 30.

Each side duct 58a, 58b, 68a, 68b has an internal gate or valve 66 which is actuatable between a closed condition shown in solid lining in FIGS. 5 and 6, an open condition shown in phantom lining in the same figures. The valves 66 may be pivoted, by means of suitable actuators which are not shown in the drawings, about an axis transverse to the respective side duct 58a,b, 68a,b so that gas pressure is balanced against the valve on either side of the pivot axis in the closed condition of the valve, and in the open condition the valve is oriented edgewise into the gas flow through the side duct. The valves 66 may be, however, of any design suitable for the purpose described herein.

Figure 7:
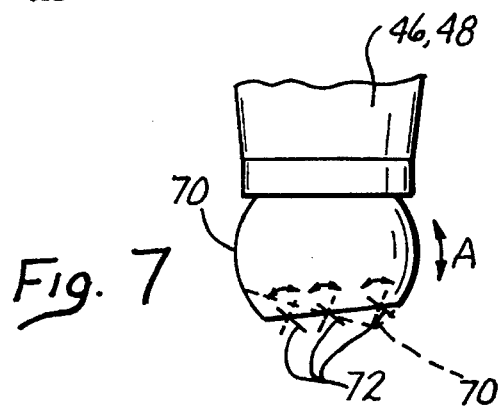
FIG. 7 is an enlarged detail view of the vectored thrust nozzles of the fan jets of FIGS. 5 and 6.

Each engine nozzle 70 is equipped with a shutter arrangement consisting of pivotable louvers 72, better seen in FIG. 7, operated by suitable actuators, such as hydraulic actuators (not shown in the drawings), between an open position (shown in solid lining) wherein the louvers 72 are oriented edge wise to the engine exhaust gases so as to offer minimum resistance to the gas flow through the nozzle, and a closed condition (shown in dotted lining) in which the louvers 72 are transverse to the exhaust gas flow, effectively closing flow through nozzle 70. Actuation of the valves 66 and nozzle louvers 72 are linked so that when one is open the other is closed. The open condition of the duct valves 66 is associated with a closed condition of the nozzle louvers 72, and the engine gases, both bypass air and engine core exhaust, are fully diverted through the side ducts 58a,b, 68a,b into the annular spaces 42, 44 for driving the fans 36, 38 respectively in order to develop vertical thrust through the fan duct 26 for sustaining the aircraft 10 in hover and vertical flight. In the closed condition of the duct valves 66, associated with an open condition of the nozzle louvers 72, all engine exhaust is directed to the engine nozzles 70 for developing forward thrust during winged flight. Intermediate positions of both the valves 66 and nozzle louvers 72 result in combined vertical and forward thrust during transitional phases of flight between vertical and winged flight modes.

Preferably, the jet exhaust nozzles 70 are vectored nozzles, e.g. ball or swivel mounted to the engines 46, 48 and linked to a suitable actuator, such as a hydraulic actuator, for turning the nozzles 70 as indicated by arrow A in FIG. 7 in order to direct the thrust of the engine for maneuvering the aircraft 10. In the alternative, the nozzle 70 may be fixed and thrust vectoring accomplished by angular adjustment of the louvers 72.

A thrust director assembly includes a director cone 74 mounted to the lower end of the hub 32 in the fan duct 26 and a director ring 76 carried by the director cone. The director cone 74 has a base diameter considerably wider than its center height and a narrow upper end suspended from the base of the center hub 32. The director cone defines an upper generally conical surface of the director 74 oriented into the airstream of the fans. The fan duct outlet 30 has an enlarged diameter with respect to the diameter of the duct inlet 28. The base diameter of the director cone 74 is such that the area of the outlet annulus 75 defined between the cone 74 and the outlet 30 is equal to the intake area of the duct inlet 28. The presence of the director cone 74 spreads the fan airstream radially outwardly around the cone, away from the fan axis which is aligned with the center of mass of the aircraft 10. The thrust director ring 76 has a diameter intermediate the base diameter of the director cone 74 and the diameter of outlet 30, and is supported by means of radial vanes 78 concentrically with the director cone in the duct exhaust opening 75, between the director cone 74 and the wall of the air duct outlet 30, as best seen in FIG. 4. The director ring 76 may be an annular band of frusto-conical shape of short height relative to its diameter. The director cone 74 defines with the wall of the duct outlet 30 a bell shaped annular throat 73 which opens into the annular exhaust aperture 75. In a neutral position, the thrust director cone 74 has its center axis aligned with the fan axis, which contains the center of mass of the aircraft 10. In this position of the thrust director assembly, shown in solid lining in FIG. 3, the throat 73 and exhaust annulus 75 are radially symmetrical and the vertical airstream driven by the counterrotating fans produces a vertical lift vector acting on the airframe 12 without net lateral force component which would tend to displace the airframe in a horizontal plane.

The director cone 74, with the ring 76, is displaceable away from its neutral, vertical position by means of control actuators (not shown in the drawings) mounted within the hub 32. For example, the control actuators may be two pairs of push-pull hydraulic actuators mounted at right angles to each other. The control actuators are effective for displacing the director cone 74 through a short swing or pendular arc away from the neutral position along substantially any radial direction from its center, as suggested in dotted lining in FIG. 3. Such angular displacement of the director cone 74 alters the geometry of the throat 73 and fan exhaust aperture 75, narrowing the throat 73 on one side of its circumference (on the right hand side in FIG. 3) and simultaneously widening the throat at a diametrically opposite location (on the left hand side in FIG. 3). The result is that thrust is restricted on the narrowed side relative to the widened side of the fan exhaust annulus 75. The fan thrust is now unbalanced relative to the center of mass of the airframe 12, imposing a lateral thrust component along a diameter line connecting the narrowest and widest points of the fan outlet opening, and in a direction away from the wide side in reaction to the relatively greater thrust on that side. In FIG. 3 the lateral thrust developed by displacement of the thrust director assembly urges the aircraft 10 towards the right on the page. The movable thrust director cone 74 can be actuated in this manner so as to counteract any drift of the aircraft 10 in the horizontal plane during vertical flight and hover. Aircraft lifted by means of ducted fans are particularly susceptible to such drift when operating in close proximity to a ground surface due to the cushion of compressed air developed between the aircraft and the ground surface and which offers very little friction to horizontal movement of the aircraft over the ground surface, making it readily responsive to gusts of wind, for example. The thrust director cone actuators may be operatively linked to an electronic position sensing system, based for example on sensitive accelerometers for detecting any spurious movement in the horizontal plane and actuating the thrust director cone 74 accordingly for automatically reacting to and counteracting such movement during ascent, descent and hover.

The aircraft 10 is further stabilized while in hover or low speed flight by gyroscopic precession developed by a differential in angular inertia between the two counterrotating fans 36, 38. A net moment of angular inertial is maintained either by one of the fans turning a greater mass than the other fan, or by turning one of the fans at a speed greater than the other fan. In FIG. 3, the lower fan 38 has a somewhat greater diameter than the upper fan 36 and a correspondingly greater rotational mass, such that a net moment of angular inertia is maintained equal to the difference between the individual moments of inertia of the counterrotating fans 36, 38. The net moment of inertia applies a reactive torque to the airframe 12, tending to turn the airframe about the fan axis in a direction opposite to rotation of the larger, lower fan 38. This yaw of the airframe is controlled by one of two alternative means. The first alternative is by means of vanes positioned in the downwash of the counterrotating fans and angled so as to transmit a torque to the airframe 12 of direction and magnitude such as to cancel the yaw induced by the net gyroscopic precession of the fans. This option is implemented by pivotal mounting of the radial vanes 78 which support the thrust director ring 76 to the director cone 74. FIG. 3a illustrates the pivotal mounting of a vane 78 about a center pivot 80 extending between the cone 74 and ring 76. Each of the radial vanes 78 is mounted in this fashion and all the vanes 78 are actuated in concert in the fan downwash to apply a torque to the airframe 12 along the axis of the center hub 32 so as to cancel the gyroscopically induced yaw. Yaw control may also be effected by configuring the middle and lower stators 34b and 34c in the fan duct to a pitch calculated to react with the fan airstream and derive a torque sufficient to counteract the yaw of the airframe. The vanes 78 may then be employed to provide a trimming torque as needed for fine control of the yaw.

In a second alternative, yaw of the airframe 12 is controlled by increased thrust from one of the fan jet engines 46, 48 so as to cancel the gyroscopically induced yaw.

In either of the just mentioned alternatives, the yaw control system may include a reference gyroscope for sensing yaw of the airframe 12 and connected through suitable control circuits and systems for actuating either the pivotal vanes 78 or engine thrust so as to automatically and precisely cancel the yaw force.

In the case where gyroscopic precession is maintained by turning one of the fans at a higher speed than the other fan, the slower turning fan may have a greater pitch angle of the fan blades than the faster turning fan, so that the reactive torque on the airframe 12 of the two counterrotating fans cancels notwithstanding the different rotational speeds, due to the greater force exerted against the air by the blades of the slower fan. This arrangement can also be used in the case where one fan is more massive than the other to maintain the gyroscopic precession. In such case, the less massive fan may have a greater pitch angle of its fan blades so as to counteract the yaw force induced by the more massive fan. The pitch angle of the fan blades, although different for the two fans 36, 38 in this form of the invention, is preferably a fixed blade pitch in the interest of simplicity and economy.

The fan duct 26 has an upper cover 90, shown open in FIGS. 2 and 3, which is made up of four panels hinged to each other and to the fuselage 14 and linked to a suitable power actuating system for opening and closing the cover. The top cover 90 is retracted to an open position by folding its four panels to an M configuration as seen in front edge view, shown in FIG. 3. The panels are hinged to each other at the upper points of the M, and are hinged to the airframe 12 at the center of the M figure. The cover 90, shown in its closed condition in FIG. 1, closes the intake 28 of the fan duct 26 for smooth airflow over the fuselage 12 in winged flight. Likewise, a number of door panels 92 are slidable on either side of the fan duct outlet 30. The door panels 92 can be brought together to a closed condition providing a smooth underside surface of the fuselage 14 during winged flight, and separated to an open condition illustrated in FIG. 3 in which the duct outlet 30 is open for vertical flight under fan power.

The operation of the aircraft 10 will now be described. In an initial unpowered condition of the aircraft 10, the airframe 12 is supported by conventional wheeled landing gear (not show in the drawings) on an underlying ground surface, not shown in the drawings. Before starting the fan jet engines 46, 48, the aircraft is placed in takeoff configuration by opening the valves 66 in all four side ducts 58, 68 and closing the engine nozzle shutters 72, so as to direct engine thrust for driving the counterrotating fans 36, 38. The upper fan cover 90 and the bottom fan cover 92 are retracted to their open positions, and the fan jet engines are started. The counter rotating fans 36, 38 are brought to speed by throttling the fan jet engines to take-off power, until the fans develop sufficient thrust to lift the aircraft 10 vertically off the ground surface. As the aircraft becomes airborne, engine power is increased to lift the aircraft 10 clear of any surrounding structures or vegetation, and to a safe altitude for initiating horizontal, forward flight. Transition to forward flight is made by gradually closing the side duct valves 66 while simultaneously opening the engine nozzle shutters 72, thereby directing engine thrust to the engine nozzles 70 and reducing drive to the fans. As forward speed increases aerodynamic lift of the wings 22 builds up and the vertical thrust provided by the fans 36, 38 may be gradually reduced by further diversion of engine exhaust to the nozzles 70, until the fans come to a stop for lack of drive and no further vertical thrust is generated. The top and bottom duct covers 90, 92 are then closed to streamline the upper and lower surfaces of fuselage 14. Thereafter, attitude control and stabilization of the aircraft 10 is accomplished entirely by the aerodynamic surfaces including wings 22, rudders 23 and canards 25. The aircraft's maneuverability in fully aerodynamic flight is in no way impeded by the angular inertia of the gyroscopic stabilization system integral with the counterrotating fans 36, 38 as already described.

Vertical descent and landing of the aircraft is accomplished by reversing the take-off procedure. As the landing site is approached, the top and bottom covers 90, 92 are retracted to open the fan duct 26, and drive is applied to the fans 36, 38 by gradually closing the nozzle shutters 72 while simultaneously and gradually opening the side duct valves 66. Lift and stabilization is gradually shifted from the aerodynamic surfaces to the counterrotating fans until the engine nozzles 70 are essentially closed and all engine exhaust is diverted to the side ducts 58, 68 for driving the fans 36, 38 for both lift and gyroscopic stabilization of the aircraft 10. Fine positioning of the aircraft 10 over the landing site may be accomplished by operation of the fan thrust director assembly 74 as the aircraft hovers or descends towards the ground surface. Attitude control of the aircraft, i.e. turning the airframe 12 to point in a different direction may be accomplished either by slight modulation of engine thrust through one or both of the jet nozzles 70, or by angular adjustment of the yaw control vanes 78 on the thrust director unit 74. The vanes 78 may be turned to a greater or lesser angle than required strictly for yaw control purposes, thereby turning the airframe 12 about its center of mass in one direction or another.

Figure 8:
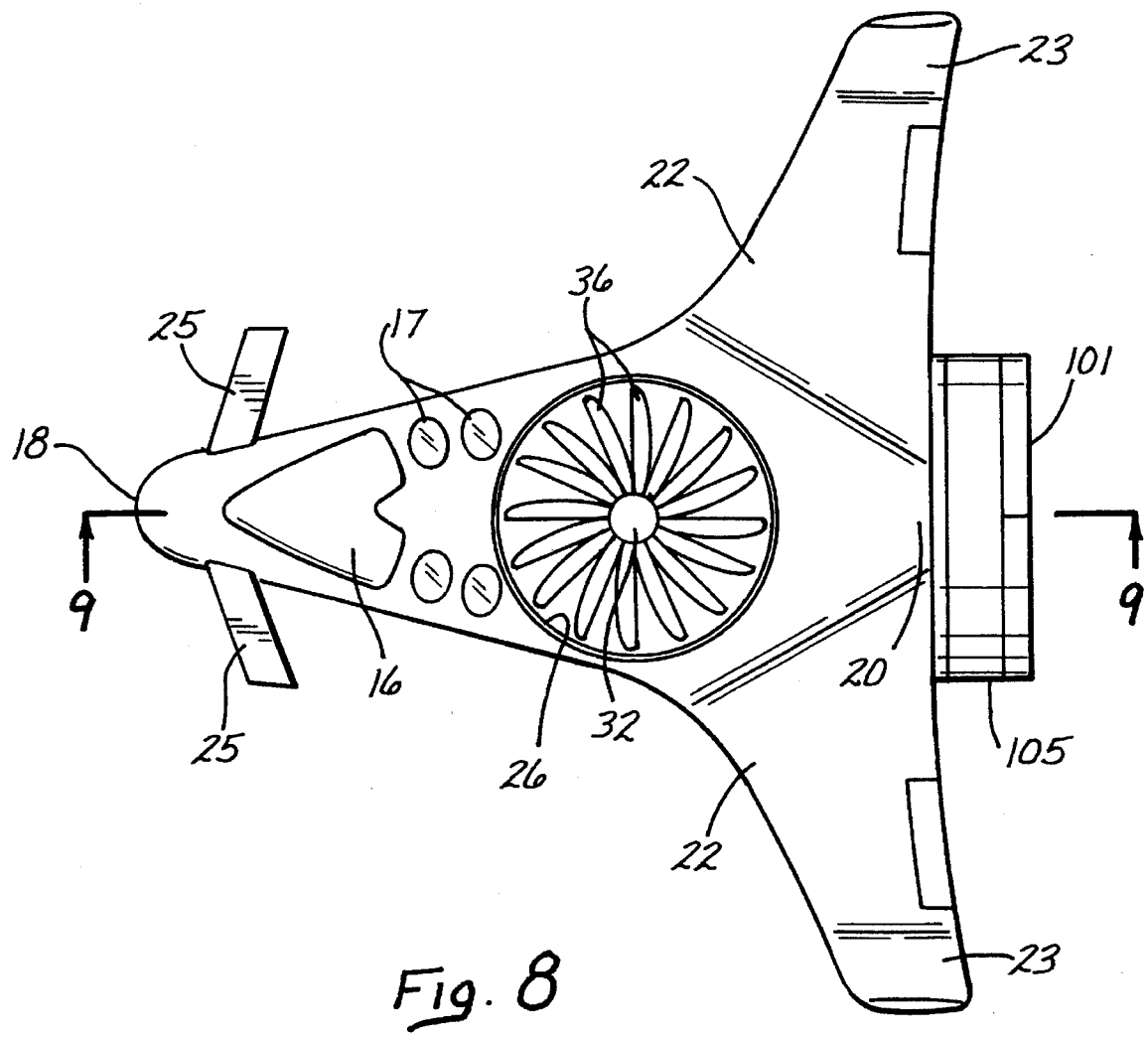
FIG. 8 is a top plan view of a vertical take-off or landing aircraft according to this invention powered by an internal combustion power plant.

FIGS. 8 through 10 show an alternate form of the vertical take-off or landing aircraft of this invention which is powered by an internal combustion power plant consisting of one or more engines, such as turbocharged reciprocating engines. Forward thrust for horizontal flight is supplied by a pusher propeller, instead of the fan jet engines in the previously described embodiment of FIGS. 1 through 7.

Numbered elements in FIGS. 8–10 correspond to like numbered elements in FIGS. 1–7. With reference to FIGS. 8 and 9, the aircraft 100 has a pusher propeller 104 enclosed in a shroud 105 with rudders 101 and which provides forward thrust to the airframe 112 in winged flight. The aircraft 100 is powered by an internal combustion engine 102 mounted within fuselage 114 between the fan duct 126 and the pusher propeller 104. The engine 102 is coupled to a gear box 108 through a drive linkage 106. The gear box 108 has two opposite, axially aligned output shafts of mutually opposite rotation and connected for driving the upper fan 136 and the lower fan 138 respectively. The two fans therefore are counterrotating while driven from a common input shaft 106.

Gyroscopic precession is established for stabilizing the aircraft 100 in the plane of rotation of the fans by one of two alternative arrangements. In a first arrangement, illustrated in FIG. 9, the lower fan 138 is of greater diameter and of greater mass than the upper fan 136. When both fans are turned at the same but opposite speed of rotation by the gear box 108, a net moment of angular inertia is maintained equal to the angular inertia of the lower fan 138 minus the angular inertial of the upper fan 136, as a function of the relative masses of the two fans. In a second arrangement the two fans are of equal mass and one of the two counterrotating fans 136, 138 can be turned at a higher speed than the other fan to establish a net moment of inertia with consequent gyroscopic stabilization of the aircraft 100. The degree of gyroscopic precession can be varied by means of a variable speed transmission 110 connected between the gear box 108 and the upper fan 136. The net gyroscopic precession can be nulled by turning the two fans at equal speed, as for example during transitional modes of flight where sufficient aerodynamic stability is available under forward thrust of the aircraft 100 but vertical fan lift is nonetheless still needed.

Yaw control, necessary to prevent rotation of the airframe 112 about the fan axis in reaction to the net moment of inertia maintained for gyroscopic precession, can be achieved by any of the alternative arrangements described in connection with the aircraft 10 of FIGS. 1–7 and which, to reiterate, include different blade pitch angle on the two counterrotating fans or operation of yaw control vanes 178 which connect the thrust director ring 176 to the thrust director cone 174. Power from engine 102 can be selectively directed to the counterrotating fans 136, 138, or to the pusher propeller 104, or simultaneously to the fans and to the pusher propeller by appropriate actuation of a fan clutch 112 between the drive shaft 106 and engine 102, and a propeller clutch 114 between the engine 102 and propeller drive shaft 116.

FIG. 10 shows an aircraft 100' which differs from the aircraft 100 in FIG. 9 in that the power plant includes two internal combustion engines 120, 122, each driving one of the counterrotating fans 136, 138 respectively. Engine 120 is coupled to a gear box 124 through a clutch 126 and drive shaft 128. Engine 122 is coupled to a gear box 130 through clutch 132 and drive shaft 134. The gear boxes 124, 130 are arranged so that the two fans turn in mutually opposite directions. The two engines 120, 122 are coupled through a propeller transfer case 138 and clutch unit 140, 142 for driving the pusher propeller 104. Provision of two engines 120, 122 allows greater flexibility in the distribution of power among the counterrotating fans and the pusher propeller of aircraft 100'. The two gear boxes 124, 130 may be coupled together by actuation of clutch 136 so that one of the engines 120, 122 may be disengaged through its corresponding clutch 126, 132 from the fan drive shaft 128, 134. The other of the two engines may then continue to drive both of the fans through the coupled gear boxes 124, 130, while the disengaged engine supplies increased power to the pusher propeller 104. Such a condition may be useful during transition between vertical and horizontal flight modes wherein increased forward thrust is desirable, while diminished vertical lift by the counterrotating fans is sufficient as aerodynamic lift develops. In case of failure of one of the engines 120, 122 the failed engine may be disengaged from both the fan drive and the pusher propeller by actuation of a corresponding pair of clutches 126,140 and 132,142, with the aircraft proceeding under reduced power. During purely vertical flight, both engines 120, 122 are disengaged from the pusher propeller 104 by actuation of the clutch units 140, 142 so that all power developed by both engines is supplied to the counterrotating fans. Conversely, during fully aerodynamic flight, both engines are disengaged from both fans by actuation of the corresponding clutches 126, 132 so that all engine power is delivered to the pusher propeller 104. Yaw control in the aircraft 100' is achieved in the manner already described with regard to aircraft 100 in FIG. 9.

While certain presently preferred embodiments of the invention have been described and illustrated for purposes of clarity and example, it must be understood that many changes, substitutions, and modifications to the described embodiments will become obvious to those possessed of ordinary skill in the art without thereby departing from the scope and spirit of the present invention, which is defined by the following claims.

What is claimed is:

1. A VTOL aircraft comprising an airframe, fan means in a fan duct defined through said airframe, means for driving said fan means for developing vertical thrust, and a thrust director cone axially aligned with said fans in a neutral position of said cone and displaceable relative to said fans for directing said fan thrust away from said vertical thereby to develop a lateral thrust component acting on said airframe.

2. A VTOL aircraft comprising an airframe, a fan duct defined through said airframe, fan means in said duct between a duct inlet and a duct outlet, means for driving said fan means for developing vertical lift, said duct outlet being of enlarged diameter relative to said duct inlet, thrust director means supported in said outlet, said thrust director means having a neutral position defining a radially symmetrical annular duct outlet of area equal to the intake area of said duct inlet, said thrust director means being displaceable for altering the geometry of said annular duct outlet thereby to develop a lateral thrust component acting on said airframe.

3. The aircraft of claim 2 wherein said thrust director means comprises a generally conical element mounted with a narrow end oriented towards said fans, said elements being axially aligned with said fan means in said neutral position thereof.

4. The aircraft of claim 3 wherein said thrust director element spreads the airstream driven by said fan means radially outwardly from the axis of said fan means thereby to augment the moment of force developed by displacement of said thrust director element.

\* \* \* \* \*